US007704144B2

(12) United States Patent
Abbott

(10) Patent No.: US 7,704,144 B2
(45) Date of Patent: Apr. 27, 2010

(54) PLAYER RANKING FOR TOURNAMENT PLAY

(75) Inventor: Eric L. Abbott, Las Vegas, NV (US)

(73) Assignee: IGT, Reno, NV (US)

( * ) Notice: Subject to any disclaimer, the term of this patent is extended or adjusted under 35 U.S.C. 154(b) by 765 days.

(21) Appl. No.: 11/337,176

(22) Filed: Jan. 20, 2006

(65) Prior Publication Data

US 2007/0173318 A1 Jul. 26, 2007

(51) Int. Cl.
*A63F 13/00* (2006.01)

(52) U.S. Cl. ............................ 463/25; 463/11; 463/12; 463/13

(58) Field of Classification Search .................. 463/16, 463/20, 25, 11, 12, 13, 40–42
See application file for complete search history.

(56) References Cited

U.S. PATENT DOCUMENTS 4,531,187 A 7/1985 Uhland
4,814,589 A 3/1989 Storch et al.
5,083,271 A 1/1992 Thacher et al.
5,166,502 A 11/1992 Rendleman et al.
5,242,163 A 9/1993 Fulton
5,265,874 A 11/1993 Dickinson et al.
5,288,081 A 2/1994 Breeding
5,344,144 A 9/1994 Canon
5,361,885 A 11/1994 Modler
5,362,053 A 11/1994 Miller
5,406,264 A 4/1995 Plonsky et al.
5,417,430 A 5/1995 Breeding
5,544,892 A 8/1996 Breeding
5,605,334 A 2/1997 McCrea, Jr.
5,613,912 A 3/1997 Slater
5,651,548 A 7/1997 French et al.
5,695,400 A * 12/1997 Fennell et al. ................ 463/42

(Continued)

FOREIGN PATENT DOCUMENTS

EP 1 672 567 6/2006

(Continued)

OTHER PUBLICATIONS

Advantage Casino System Table Touch Brochure, written by IGT, published in 2004.

(Continued)

*Primary Examiner*—Ronald Laneau
*Assistant Examiner*—Ross A. Williams
(74) *Attorney, Agent, or Firm*—K&L Gates LLP

(57) ABSTRACT

Apparatus, system and methods for ranking tournament players are disclosed. The apparatus includes a RFID tournament detection system coupled to a server. The server is provided with game data as one or more tournaments proceed. According to tournament rules, player activity may result in a player being eliminated. When a player is eliminated, the server or detection system records the time and date coupled to each player's identification and may rank each player on an ongoing basis or at the end of the tournament. Players do not need to compete at the same site, but may be ranked according to a player's current status within the tournament as captured by the tournament detection system and recorded by the server, which receives data from each game table participating in the tournament.

24 Claims, 6 Drawing Sheets

U.S. PATENT DOCUMENTS

| | | | | |
|---|---|---|---|---|
| 5,707,287 | A | 1/1998 | McCrea, Jr. | |
| 5,735,525 | A | 4/1998 | McCrea, Jr. | |
| 5,735,742 | A | 4/1998 | French | |
| 5,755,621 | A | 5/1998 | Marks et al. | |
| 5,769,716 | A | 6/1998 | Saffari et al. | |
| 5,770,533 | A | 6/1998 | Franchi | |
| 5,781,647 | A | 7/1998 | Fishbine et al. | |
| 5,785,321 | A | 7/1998 | van Putten et al. | |
| 5,803,808 | A | 9/1998 | Strisower | |
| 5,806,045 | A | 9/1998 | Biorge et al. | |
| 5,809,482 | A | 9/1998 | Strisower | |
| 5,820,460 | A | 10/1998 | Fulton | |
| 5,833,536 | A | 11/1998 | Davids et al. | |
| 5,851,148 | A | 12/1998 | Brune et al. | |
| D404,436 | S | 1/1999 | McGahn et al. | |
| 5,890,717 | A | 4/1999 | Rosewarne et al. | |
| 5,902,983 | A | 5/1999 | Crevelt et al. | |
| 5,911,418 | A | 6/1999 | Adams | |
| 5,911,626 | A | 6/1999 | McCrea, Jr. | |
| 5,919,090 | A | 7/1999 | Mothwurf | |
| 5,941,769 | A | 8/1999 | Order | |
| 5,947,820 | A | 9/1999 | Morro et al. | |
| 5,957,776 | A | 9/1999 | Hoehne | |
| 5,970,143 | A * | 10/1999 | Schneier et al. | 713/181 |
| 5,984,310 | A | 11/1999 | English | |
| 6,019,374 | A | 2/2000 | Breeding | |
| 6,039,648 | A | 3/2000 | Guinn et al. | |
| 6,039,650 | A | 3/2000 | Hill | |
| 6,093,103 | A | 7/2000 | McCrea, Jr. | |
| 6,117,012 | A | 9/2000 | McCrea, Jr. | |
| 6,165,069 | A | 12/2000 | Sines et al. | |
| 6,186,895 | B1 | 2/2001 | Oliver | |
| 6,254,484 | B1 | 7/2001 | McCrea, Jr. | |
| 6,267,671 | B1 | 7/2001 | Hogan | |
| 6,287,202 | B1 | 9/2001 | Pascal et al. | |
| 6,299,534 | B1 | 10/2001 | Breeding et al. | |
| 6,299,536 | B1 | 10/2001 | Hill | |
| 6,313,871 | B1 | 11/2001 | Schubert | |
| 6,346,044 | B1 | 2/2002 | McCrea, Jr. | |
| 6,454,649 | B1 | 9/2002 | Mattice et al. | |
| 6,460,848 | B1 | 10/2002 | Soltys et al. | |
| 6,464,584 | B2 | 10/2002 | Oliver | |
| 6,488,585 | B1 | 12/2002 | Wells et al. | |
| 6,514,140 | B1 | 2/2003 | Storch | |
| 6,517,435 | B2 | 2/2003 | Slotys et al. | |
| 6,530,837 | B2 | 3/2003 | Soltys et al. | |
| 6,533,276 | B2 | 3/2003 | Soltys et al. | |
| 6,533,662 | B2 | 3/2003 | Soltys et al. | |
| 6,561,897 | B1 | 5/2003 | Bourbour et al. | |
| 6,579,180 | B2 | 6/2003 | Soltys et al. | |
| 6,579,181 | B2 | 6/2003 | Soltys et al. | |
| 6,581,747 | B1 | 6/2003 | Charlier et al. | |
| 6,582,301 | B2 | 6/2003 | Hill | |
| 6,595,857 | B2 | 7/2003 | Soltys et al. | |
| 6,609,710 | B1 | 8/2003 | Order | |
| 6,612,928 | B1 | 9/2003 | Bradford et al. | |
| 6,619,662 | B2 | 9/2003 | Miller | |
| 6,626,757 | B2 | 9/2003 | Oliveras | |
| 6,629,019 | B2 | 9/2003 | Legge et al. | |
| 6,629,591 | B1 | 10/2003 | Griswold et al. | |
| 6,629,889 | B2 | 10/2003 | Mothwurf | |
| 6,638,161 | B2 | 10/2003 | Soltys et al. | |
| 6,652,378 | B2 | 11/2003 | Cannon et al. | |
| 6,652,379 | B2 | 11/2003 | Soltys et al. | |
| 6,659,861 | B1 * | 12/2003 | Faris et al. | 463/1 |
| 6,659,875 | B2 | 12/2003 | Purton | |
| 6,663,490 | B2 | 12/2003 | Soltys et al. | |
| 6,671,358 | B1 | 12/2003 | Seidman et al. | |
| 6,672,589 | B1 | 1/2004 | Lemke et al. | |
| 6,685,564 | B2 | 2/2004 | Oliver | |
| 6,685,568 | B2 | 2/2004 | Soltys et al. | |
| 6,688,979 | B2 | 2/2004 | Soltys et al. | |
| 6,690,673 | B1 | 2/2004 | Jarvis | |
| 6,709,333 | B1 | 3/2004 | Bradford et al. | |
| 6,712,696 | B2 | 3/2004 | Soltys et al. | |
| 6,733,388 | B2 | 5/2004 | Mothwurf | |
| 6,747,560 | B2 | 6/2004 | Stevens, III | |
| 6,758,751 | B2 | 7/2004 | Soltys et al. | |
| 6,834,251 | B1 | 12/2004 | Fletcher | |
| 6,843,725 | B2 | 1/2005 | Nelson | |
| 6,848,994 | B1 | 2/2005 | Knust et al. | |
| 6,860,810 | B2 | 3/2005 | Cannon et al. | |
| 6,884,168 | B2 | 4/2005 | Wood et al. | |
| 6,967,563 | B2 | 11/2005 | Bormaster | |
| 7,011,309 | B2 | 3/2006 | Soltys et al. | |
| 7,017,805 | B2 | 3/2006 | Meehan | |
| 7,018,291 | B1 | 3/2006 | Lemke et al. | |
| 7,114,718 | B2 | 10/2006 | Grauzer et al. | |
| 7,152,045 | B2 | 12/2006 | Hoffman | |
| 7,172,507 | B2 | 2/2007 | Fujimoto et al. | |
| 2002/0028707 | A1 | 3/2002 | Pascal et al. | |
| 2002/0039923 | A1 | 4/2002 | Cannon et al. | |
| 2002/0042298 | A1 | 4/2002 | Soltys et al. | |
| 2002/0042299 | A1 | 4/2002 | Soltys et al. | |
| 2002/0068625 | A1 | 6/2002 | Soltys et al. | |
| 2002/0072405 | A1 | 6/2002 | Soltys et al. | |
| 2002/0072407 | A1 | 6/2002 | Soltys et al. | |
| 2002/0147042 | A1 | 10/2002 | Vuong et al. | |
| 2002/0151342 | A1 | 10/2002 | Tracy et al. | |
| 2002/0160825 | A1 | 10/2002 | Nicastro et al. | |
| 2002/0177480 | A1 | 11/2002 | Rowe | |
| 2003/0003997 | A1 | 1/2003 | Vuong et al. | |
| 2003/0060264 | A1 | 3/2003 | Chilton et al. | |
| 2003/0070178 | A1 | 4/2003 | Boyd et al. | |
| 2003/0087696 | A1 | 5/2003 | Soltys et al. | |
| 2003/0130041 | A1 | 7/2003 | Pascal et al. | |
| 2003/0151194 | A1 | 8/2003 | Hessing et al. | |
| 2003/0162588 | A1 | 8/2003 | Brosnan et al. | |
| 2003/0171142 | A1 | 9/2003 | Kaji et al. | |
| 2003/0176219 | A1 | 9/2003 | Manfredi et al. | |
| 2003/0186745 | A1 | 10/2003 | Nguyen et al. | |
| 2003/0199321 | A1 | 10/2003 | Williams | |
| 2004/0029631 | A1 | 2/2004 | Duhamel | |
| 2004/0142743 | A1 | 7/2004 | Oliver | |
| 2004/0204226 | A1 | 10/2004 | Foster et al. | |
| 2004/0224777 | A1 | 11/2004 | Smith et al. | |
| 2004/0229700 | A1 | 11/2004 | Cannon et al. | |
| 2004/0251630 | A1 | 12/2004 | Sines et al. | |
| 2005/0005127 | A1 | 1/2005 | Rowe et al. | |
| 2005/0026680 | A1 | 2/2005 | Gururajan | |
| 2005/0026683 | A1 | 2/2005 | Fujimoto | |
| 2005/0043088 | A1 | 2/2005 | Nguyen et al. | |
| 2005/0043089 | A1 | 2/2005 | Nguyen et al. | |
| 2005/0043094 | A1 | 2/2005 | Nguyen et al. | |
| 2005/0051963 | A1 | 3/2005 | Snow | |
| 2005/0054408 | A1 | 3/2005 | Steil et al. | |
| 2005/0062226 | A1 | 3/2005 | Schubert et al. | |
| 2005/0063072 | A1 | 3/2005 | Harada | |
| 2005/0082750 | A1 | 4/2005 | Grauzer et al. | |
| 2005/0119048 | A1 | 6/2005 | Soltys et al. | |
| 2005/0212214 | A1 * | 9/2005 | Pfeiffer et al. | 273/292 |
| 2005/0215300 | A1 | 9/2005 | Oliveras | |
| 2005/0219599 | A1 | 10/2005 | White et al. | |
| 2005/0221882 | A1 | 10/2005 | Nguyen et al. | |
| 2005/0225080 | A1 | 10/2005 | Wicker | |
| 2005/0233794 | A1 | 10/2005 | Cannon et al. | |
| 2005/0282622 | A1 | 12/2005 | Lindquist | |
| 2005/0288086 | A1 | 12/2005 | Schubert et al. | |
| 2006/0001211 | A1 | 1/2006 | Lewis et al. | |
| 2006/0019739 | A1 | 1/2006 | Soltys et al. | |
| 2006/0027970 | A1 | 2/2006 | Kyrychenko | |
| 2006/0058082 | A1 | 3/2006 | Crawford, III et al. | |
| 2006/0058083 | A1 | 3/2006 | Crawford, III et al. | |
| 2006/0058084 | A1 | 3/2006 | Crawford, III et al. | |

| | | | | |
|---|---|---|---|---|
| 2006/0058085 | A1 | 3/2006 | White et al. | |
| 2006/0058086 | A1 | 3/2006 | White et al. | |
| 2006/0058087 | A1 | 3/2006 | White et al. | |
| 2006/0058088 | A1 | 3/2006 | Crawford, III et al. | |
| 2006/0058089 | A1 | 3/2006 | White et al. | |
| 2006/0058090 | A1 | 3/2006 | Crawford, III et al. | |
| 2006/0058091 | A1 | 3/2006 | Crawford, III et al. | |
| 2006/0058092 | A1 | 3/2006 | Crawford, III et al. | |
| 2006/0058093 | A1 | 3/2006 | White et al. | |
| 2006/0066052 | A1 | 3/2006 | White et al. | |
| 2006/0068498 | A1 | 3/2006 | White et al. | |
| 2006/0068864 | A1 | 3/2006 | White et al. | |
| 2006/0068865 | A1 | 3/2006 | White et al. | |
| 2006/0068866 | A1 | 3/2006 | White et al. | |
| 2006/0068868 | A1 | 3/2006 | Crawford, III et al. | |
| 2006/0068869 | A1 | 3/2006 | White et al. | |
| 2006/0068870 | A1 | 3/2006 | Crawford, III et al. | |
| 2006/0068871 | A1 | 3/2006 | Crawford, III et al. | |
| 2006/0068879 | A1 | 3/2006 | Crawford, III et al. | |
| 2006/0068899 | A1 | 3/2006 | White et al. | |
| 2006/0128453 | A1 | 6/2006 | Hoffman | |
| 2006/0128472 | A1 | 6/2006 | Beavers | |
| 2006/0135238 | A1 | 6/2006 | Lancaster et al. | |
| 2006/0138728 | A1 | 6/2006 | Gordon et al. | |
| 2006/0148565 | A1 | 7/2006 | Gauselmann et al. | |
| 2006/0157934 | A1 * | 7/2006 | Yoseloff et al. | 273/292 |
| 2006/0160600 | A1 | 7/2006 | Hill et al. | |
| 2006/0160608 | A1 | 7/2006 | Hill et al. | |
| 2006/0165254 | A1 | 7/2006 | Fujimoto et al. | |
| 2006/0177109 | A1 | 8/2006 | Storch | |
| 2006/0178185 | A1 | 8/2006 | Weis | |
| 2006/0183540 | A1 | 8/2006 | Grauzer et al. | |
| 2006/0202422 | A1 | 9/2006 | Bahar | |
| 2006/0214372 | A1 | 9/2006 | Picken | |
| 2006/0223638 | A1 | 10/2006 | Koyama et al. | |
| 2006/0226605 | A1 | 10/2006 | Kenny | |
| 2006/0232012 | A1 | 10/2006 | Boyer | |
| 2006/0252521 | A1 | 11/2006 | Gururajan et al. | |
| 2006/0252554 | A1 | 11/2006 | Gururajan et al. | |
| 2006/0258427 | A1 | 11/2006 | Rowe et al. | |
| 2006/0258442 | A1 | 11/2006 | Ryan | |
| 2006/0264252 | A1 | 11/2006 | White et al. | |
| 2006/0287066 | A1 | 12/2006 | Crawford, III et al. | |
| 2006/0287067 | A1 | 12/2006 | White et al. | |
| 2006/0287101 | A1 | 12/2006 | Crawford, III et al. | |
| 2006/0287102 | A1 | 12/2006 | White et al. | |
| 2006/0287103 | A1 | 12/2006 | Crawford, III et al. | |
| 2006/0287104 | A1 | 12/2006 | White et al. | |
| 2006/0293099 | A1 | 12/2006 | Cooper | |
| 2007/0026204 | A1 | 2/2007 | Caulley et al. | |
| 2007/0029394 | A1 | 2/2007 | Wicker et al. | |
| 2007/0035399 | A1 | 2/2007 | Hecht et al. | |
| 2007/0057469 | A1 | 3/2007 | Grauzer et al. | |
| 2007/0060311 | A1 | 3/2007 | Rowe et al. | |
| 2007/0077977 | A1 | 4/2007 | Grauzer et al. | |
| 2007/0077987 | A1 | 4/2007 | Gururajan et al. | |
| 2007/0087823 | A1 | 4/2007 | Walker et al. | |

FOREIGN PATENT DOCUMENTS

| | | |
|---|---|---|
| EP | 1 672 596 | 6/2006 |
| EP | 1 672 602 | 6/2006 |
| EP | 1 710 000 | 10/2006 |
| EP | 1 532 594 | 11/2006 |
| GB | 2 423 356 | 8/2006 |
| WO | WO 98/00210 | 1/1998 |
| WO | WO 00/22585 | 4/2000 |
| WO | WO 2004/021294 | 3/2004 |
| WO | WO 2004/112923 | 12/2004 |
| WO | WO 2005/009563 | 2/2005 |
| WO | WO 2005/025696 | 3/2005 |
| WO | WO 2005/025701 | 3/2005 |
| WO | WO 2005/037385 | 4/2005 |
| WO | WO 2005/102480 | 11/2005 |
| WO | WO 2005/123203 | 12/2005 |
| WO | WO 2006/037220 | 4/2006 |
| WO | WO 2006/041655 | 4/2006 |
| WO | WO 2006/096752 | 9/2006 |
| WO | WO 2006/106192 | 10/2006 |
| WO | WO 2006/127128 | 11/2006 |
| WO | WO 2007/006002 | 1/2007 |

OTHER PUBLICATIONS

Diamond Dash Web Page http://www.arcadeplanet.com/images/diamond_dash.jpg written by Arcade Planet, Inc., printed on Mar. 31, 2004.

Frequently Asked Questions about the Table iD System Article, written by IGT, published in 2006.

IGT Gaming Systems Brochure, written by IGT, published in 2002.

Tournamania Advertisement, written by Atronic Casino Technology, Ltd., published in 2005.

Office Action dated Jan. 29, 2009 for U.S. Appl. No. 11/556,919. (17 pages).

Office Action dated Jun. 29, 2009 for U.S. Appl. No. 11/556,919. (19 pages).

Communication pursuant to Article 94(3) EPC for European Patent Application No. 07250145.5, issued on Sep. 22, 2009. (1 page).

International Search Report for European Patent Application No. 07250145.5, issued on Jan. 23, 2009. (6 pages).

* cited by examiner

PLAYER RANKING FOR TOURNAMENT PLAY

FIELD OF THE INVENTION

The invention relates to gaming tournaments and more particularly to systems, methods and apparatus for ranking players during a gaming tournament.

RELATED ART

RFID (Radio Frequency Identification) type tags have become a popular way to monitor and track items. RFID tags have found use in stores, to rack merchandise, and in warehouses, to track product. Casinos often utilize RFID technology within tokens to monitor how much a player has bet. RFID technology provides for rapid access, without a wired connection, to data on the RFID tag.

Although RFID technology has numerous uses, one such example environment is in connection with gambling. Gambling has become a popular form of entertainment in the United States and in numerous foreign countries. Although numerous wagering events are offered within the casino or other gaming environment, one of the most traditional and popular forms of wagering occurs at table games. As is widely understood, traditional table games utilize a playing surface, often called a felt, upon which a dealer or other game operator offers a wagering event to one or more players or upon which a player may make a bet or wager.

As compared to slot or video type games, traditional table games offer greater excitement for some players, group play, and often attract big money players, which can result in larger profit margins for the casino. Prior art systems make use of gaming tokens embedded with Radio Frequency Identification ("RFID") to track a player's betting for this purpose. An example of such a system is the Mikohn® Gaming Corporation's d/b/a Progressive Gaming International Corporation's Tablelink® product.

Lately, significant interest in playing and watching poker has occurred principally because of the broadcast of tournaments such as the World Series of Poker® and the World Poker Tour™. Some of these tournaments have entry fees as high as $10,000. Players compete in what is known as satellite or super satellite tournaments where the prize is an entry fee into the tournament. Due to the low entry fees for satellite tournaments which can be hundreds of dollars a large number of players is required to pool enough money to pay the entry fee in a bigger tournament. The more players in any poker tournament the higher the prize money and the higher the interest.

Typically players travel to specifically designated casinos to enter a tournament. Such a tournament may go on for many days and nights and is costly and tiring to the players especially if the players need to travel long distances. Moreover, players in various countries around the world may wish to participate in such a tournament but may be precluded for a variety of reasons.

While playing tournament games in a casino, each table may have a set number of players at each table (such as 10 or 11 players). As the numbers of players at each table dwindle, the remaining players may be assigned to other tables and compete against other winners. Meanwhile, the same tournament process may be occurring at other casinos. By a process of elimination, a final set of players win seats in a final tournament table. The prior art has tournaments or satellites occurring at one location. The reason why tournaments occur at one location is because the order when a player runs out of chips determines the place of the player in the tournament and the associated prize money.

As a drawback to the prior art, when tournaments or competition play is held between players located at different locations is that it is difficult to determine the order in which players exit the tournament. As is commonly understood, the position at which a player finishes (rank) in the tournament may determine the player's winnings or whether they are allowed to move on to another tournament. For some tournaments, tens or hundreds of thousands of dollars in winnings may separate a single different position in tournament rank. However, if a tournament is a satellite type tournament occurring at a first location, a second location, and a third location, with a first player, second player and third player located at each respective location then determining tournament rank for players is difficult. In such an environment, if the first player, second player and third player all lose and become out of the tournament at approximately the same time it can be difficult, if not impossible, to determine the rank of each player when the players are located at different locations, i.e. different tables, casinos, or cities. Internet poker tournaments have been proposed but do not provide a casino environment or interactive gaming.

The system, method and apparatus described below overcome these drawbacks in current tournament play and provide additional benefits.

SUMMARY

To overcome the drawbacks of the prior art and provide additional benefits, disclosed herein is a method and apparatus for tracking player rank in a tournament. Although the system maybe adopted for use in any type tournament, it provide particular benefit in a tournament where, due to the size or arrangement of the tournament, players are located at different tables. As can be appreciated, if players are located at different tables and, as a result of game play two players at different tables lose all their tokens, i.e. are out of the tournament at about the same time, it may be difficult to determine which player exited the tournament first. The method and apparatus disclosed herein tracks game play using DID elements and tables equipped to track DID elements to determine the precise time of game events, regardless of the location of the table. Any type game event may be tracked that is selected to determine when a player is out of the tournament. Game event data from each table is provided to a central processing station, such as a server, to determine tournament rank for all players based on game event input from the various tables and sites at which the tournament is occurring.

In one embodiment, a method for establishing player rank in a wagering tournament is disclosed which comprises offering a wagering game at a first location to at least one first location player. In this embodiment the wagering game is part of the tournament. The method also offers a wagering game at a second location to at least one second location player such that this wagering game is also part of the tournament. The method monitors play of the wagering games at the first location and the second location with DID elements to detect game events associated with the first player and the second player. During game play, time stamping the game events occurs to create time stamped game events and the time stamped game events are sent to a processor. The processor is configured to determine a player's rank based on the time stamped game events.

In one embodiment the DID element comprises a RFID tag configured to be detected by a gaming table configured with one or more antenna. It is also contemplated that the RFID tag may be located within player tokens which are used for betting. The game events may be selected from a group of game events comprising an all in type wager by a player, a winning player receiving a tokens from the pot, cards being revealed, and a play ID being placed in a wager zone.

It is further contemplated that the first location may comprise a different gaming table than the second location and the wagering game may comprise a card game. Player ranking accurately determines whether the first player finishes higher in the tournament than the second player. In addition, the step of monitoring may comprise utilizing one or more DID elements within one or more of tokens, cards, or player IDs to time stamp when a game event occurs that forces the first player or the second player out of the tournament.

Also disclosed herein is a system for ranking players in a gaming tournament. This system comprises a first and second game table, wherein the first and second game table comprises a wagering area configured to accept wagers from one or more players and a DID element detection system proximate the wagering area. The detection system is configured to detect game events comprising movement or placement of one or more DID element during game play. Also part of the detection system is a processor in communication with the DID element detection system. The processor is configured to receive the game event data, wherein the game events have a time stamp associated therewith. A server is provided and configured to receive input from each detection system and determine player ranking based on the time stamp of game events.

In one embodiment the detection system comprises one or more antenna and one or more readers. The DID element may be located within a wagering token or playing card. Furthermore, the detection system processor may comprise a computer configured with machine readable code. It is contemplated that the first table and the second table may be located in different casinos. In one configuration the game event data comprises data regarding events that occur during a wagering game that indicate a player, playing at the first table or second table, is out of the tournament. Example of the game event data may comprise data regarding a player going all in, a player exposing their cards, a final community card being exposed, a pot being collected or provided to a winning player, or a player providing their player ID token to a wager area. In addition, the detection system processor may be configured to utilize the Internet to transmit game data to the server.

In another method of operation, A method of offering a wagering tournament wherein participants are located at different locations, is disclosed. In this embodiment the method comprises providing a game table at a first location to a first group of players, wherein the game table is configured with an RFID table monitoring system and DID elements to monitor game events. The method then creates first location game event data, wherein the first location game event data is time stamped, and provides a game at a second location to a second group of players. The game table is configured with an RFID table monitoring system and DID elements to monitor game events. This process also occurs at a second location. The method of operation also transmits at least some first location game event data and at least some second location game event data to a central processing site. At this site, the method processes at least some first location game event data and at least some second location game event data in relation to the time stamp to determine a chronological order to the game events at the first location and second location. Based on this processing the method then determines player ranking between players regardless of whether the player is located in the first group or the second group.

In one embodiment the central processing site is located at the first location or the second location. The player ranking represents or determines an order of exit from the tournament and the player ranking accurately determines order of finish between a first group player and a second group player when the first group player and a second group player exit the tournament at similar times. The game event data at each location is performed by a processor based on input from the RFID table monitoring system.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Various tournament style games that are offered for play in the gaming industry are known. During many games, radio frequency identification (hereinafter denoted RFID) devices, elements and systems may be used to track amounts bet by a player and as further described herein. Without limiting the disclosure herein, several embodiments of using such RFID devices, elements and systems in games as illustrated below may be applied to any tournament game environments, as well as in any environment where ranking of players by time and date stamping is desirable.

Furthermore, the term "token" may refer to a DID (detectable identification device) type token. The term DID is defined to mean any technology that may be associated with the token or in any way imbedded within the token to allow for detection of the token using sensing technology. One example of DID technology is radio frequency identification (RFID) technology wherein a sensor is imbedded within a token and the sensor may be activated or powered using an antenna and/or energy emitting device thereby causing the DID to emit data. RFID tokens are available from several gaming suppliers.

1. Exemplary RFID Gaming Detection System Embodiments

Figure 1:
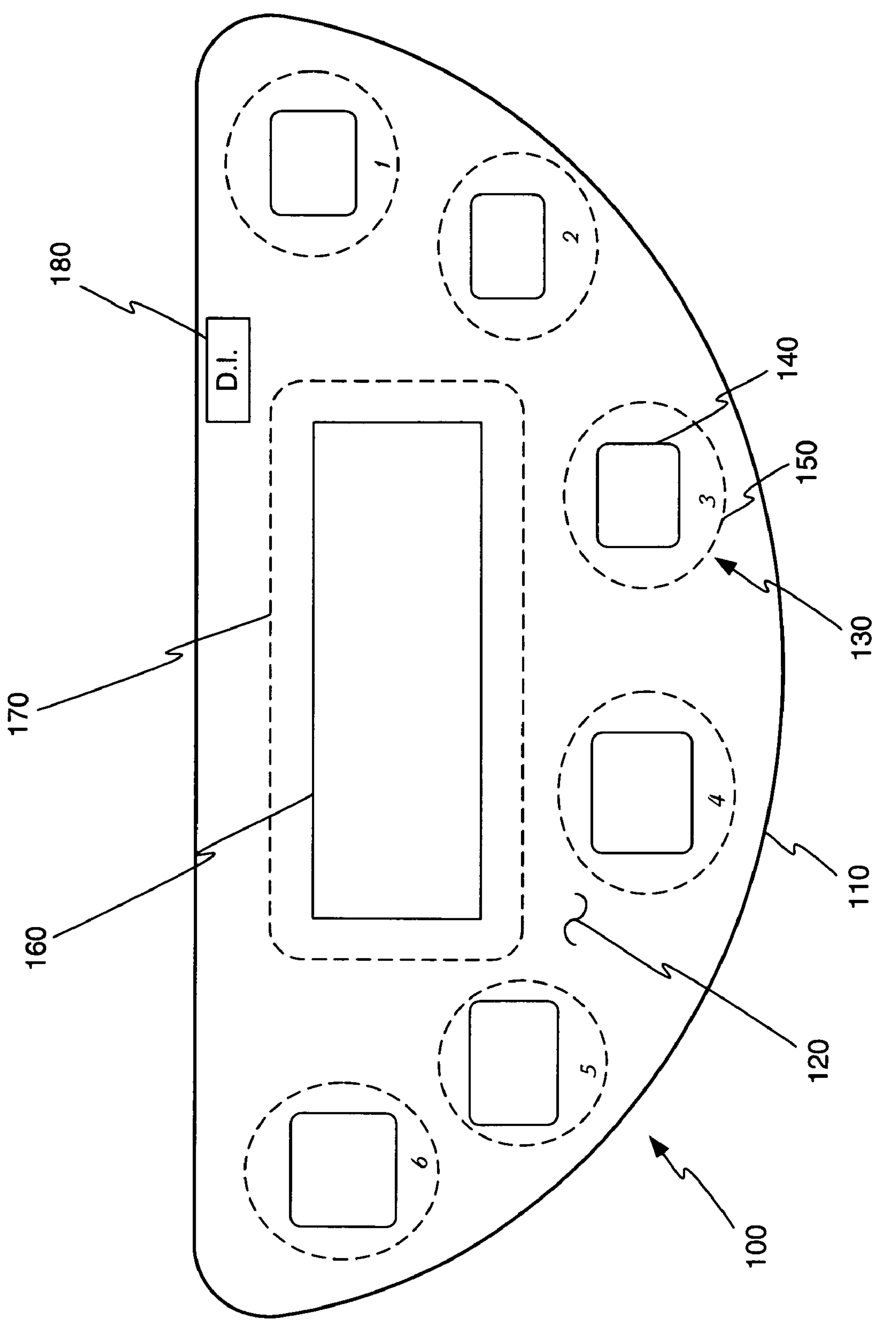
FIG. 1 illustrates a top plan view of an example embodiment of a gaming table.

FIG. 1 illustrates a top plan view of an example embodiment of a gaming table 100. This is but one possible table arrangement and layout and it is contemplated that one of ordinary skill in the art may arrive at other table arrangements to promote game play or accommodate a greater or fewer number of players. For example, it is contemplated that the method and apparatus described herein may be utilized with any game layout. Likewise, the table can be configured in a stand-up or sit down arrangement.

In this example embodiment gaming table 100 includes an outer edge 110 surrounding a generally flat top surface 120. The table may also be configured to accommodate other types of traditional table games including, but not limited to, any type poker game, dice games such as a modified form of craps, baccarat, or non-proprietary table games such as roulette, and other games which use dice, wheels, or cards or any combination of dice, wheels, or cards. Table games include games of chance that use cards or dice, and tokens (also denoted as gaming chips) which may be of differing values. Such table games include traditional community card games of chance and more particularly poker games such as Texas Hold'em, Omaha Hold'em and the like.

As is well known by a person skilled in the art, in a community card game, community playing cards may be dealt with their face up on a gaming table and shared by all players. In these games, each player may be initially dealt an incomplete face down hand, which may then be combined with the face up community cards to make a complete hand. The set of community cards may be dealt in a simple line or arranged in a special pattern. Rules of each game determine how community cards may be combined with each player's face down hand.

Traditional table games also include proprietary games such as Caribbean Stud Poker® which include a progressive jackpot. Other proprietary traditional table games include games such as Three Card Poker®, Royal Match 21® and Texas Hold'em Bonus™. Proprietary table games are table games for which a casino will lease or purchase from a manufacturer because the proprietary traditional table game is protected by the intellectual property of the manufacturer. The term "traditional table game" is used to distinguish from products offered by TableMAX® and Digideal's Digital 21™ which use video representations of cards. There are other non-traditional table games that have digital roulette wheels with video or digital images of dealers.

Figure 2:
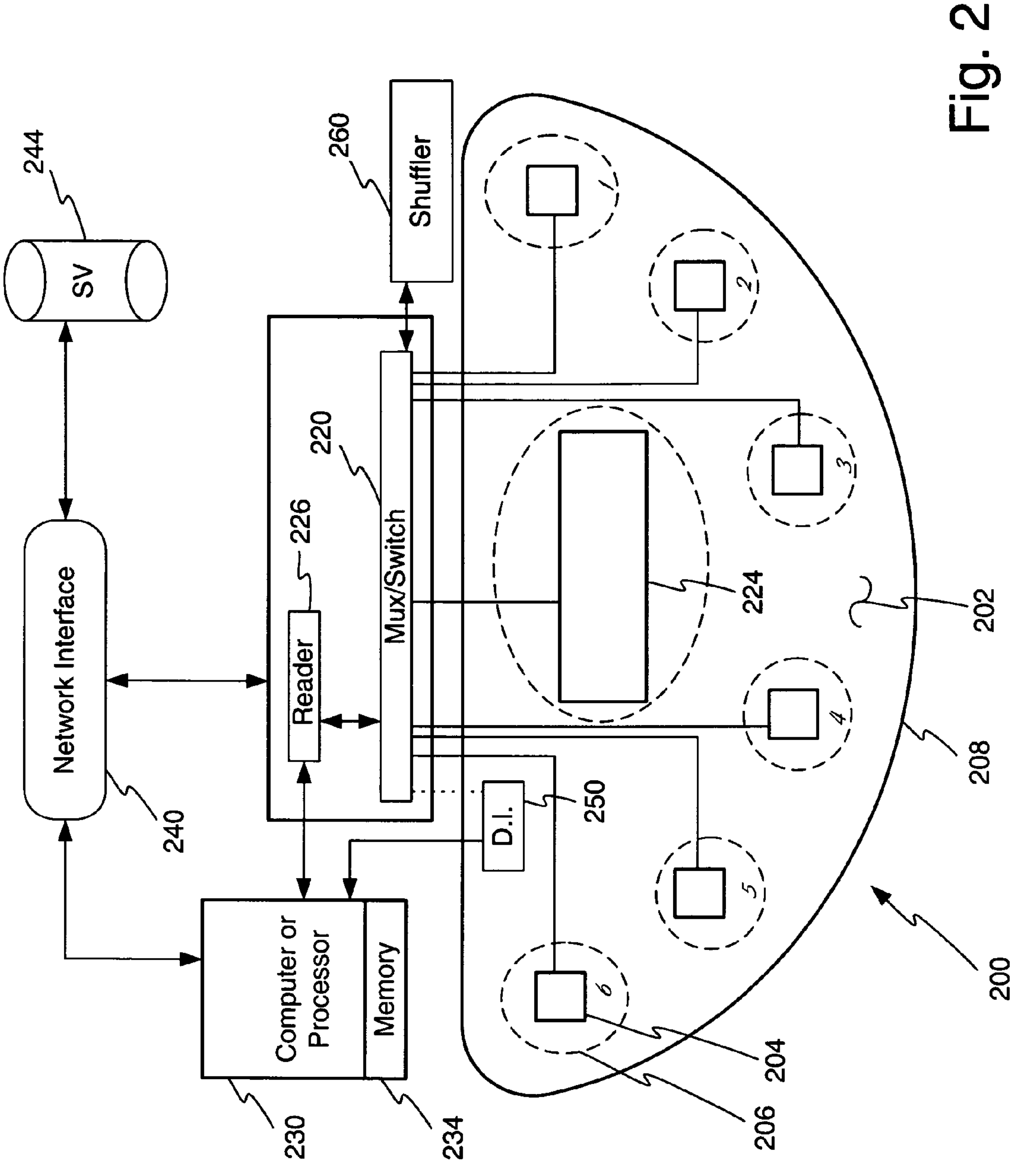
FIG. 2 illustrates a block diagram of a detection system in connection with a gaming table.

In this example embodiment of a gaming table 100, there is an outer edge 110 of the table. One or more player locations or stations 130 (also denoted herein as player locations) are provided and configured for use by a player to participate in a wagering game or a game of chance offered at the table such as poker. As is commonly understood, the player stations 130 and a dealer station may be located around the entire edge of the table as is the common configuration for poker tables. The table illustrated in FIGS. 1 and 2 is shown with player stations 130 around only a portion of the table to provide a cleaner illustration in FIG. 2 when the detection system is shown. The table 100 may assume any shape and the player stations 130 and dealer station may be at any location around the table.

In this embodiment the player stations 130 comprise a player spot 140 wherein a player accumulates the player's tokens during the course of play. For example, the player may place original gaming chips (or tokens) and tokens that are won within the area of player spot 140 during the course of play. Overlapping the player spot 140 is a detection zone 150. The detection zone 150 comprises a zone within which a token detection system (see description below) may detect a player's tokens and the denominational value of the tokens. Likewise, other data stored on the tokens may also be detected by a token detection system.

In other various embodiments, one or more wager and/or card spots 160 may be located in one or more other locations on the table surface 120. By way of example, a wager and/or card spot 160 may be located as shown in FIG. 1 and shared by more than one player. In operation, when a player makes a wager, a player takes tokens from the player's token zone and places them in the wager zone. Overlapping the wager and/or card spot 160 is a detection zone 170. The detection zone 170 comprises an area within which a pot detection system (see description below) may detect the presence of a pot comprising one or more wagered tokens. The detection zone 170 may also detect denominational value of tokens, incrementing value of the pot as wagers are made and total value of the pot in the course of play.

Additionally, the table may comprise supplement bet spots, token buy-in spots and the like that have detection capability to detect supplemental bets and player's buy-in (not shown in FIG. 1). A supplemental detection zone (not shown in FIG. 1) may also be added to detect multiple bets that are required or optional by a player in proprietary table games such as Caribbean Stud Poker®, Three Card Poker®, Royal Match 21®, Texas Hold'em Bonus™, and Two Card Joker Poker™.

Optionally, in another embodiment of the table, the table's player spots may be configured as card spots and associated card detection zones. Playing cards may be configured with DID elements detectable in the card detection zones. Furthermore, the wager and/or card spot 160 and the detection zone 170 may be configured with one or more community card spots with associated community card detection zones. As is understood, many wagering games utilized community cards which are shared by the players. Hence, within the detection zone 170 any DID equipped element may be detected by the detection system. In operation, a player may receive playing cards from a dealer and place them on a player's card spot. Each player's cards may be detected in an associated card detection zone. Additionally, community cards may be dealt by the dealer onto the community card spots and be detected in one or more community cards detection zones. The wager and/or card spot 160 and the detection zone 170 may also detect or provide space for display of community cards.

In yet another optional embodiment of the table, a table's player spot may be configured to detect a player ID and hence it would also serve as a player ID detection zone. In operation, a player may be allocated a player DID token (or other element) comprising a unique player ID prior to entering a tournament. The player DID token may configured with other player information including, but not limited to date and time that the player received the player DID token. When the player is assigned to a gaming table 100, the player places the player DID token in or on the player ID spot, such as player spot 140. Absence of a player DID token at a player station such as player station 130 may indicate no player at the player station.

Without limiting the disclosure, it will be appreciated that the table 100 may comprise any number of or combination of detection spots and associated detection zone as discussed above to achieve operation as described herein.

In one example embodiment the table may comprise a dealer station (not shown in FIG. 1) for a dealer. As is generally understood, the dealer may present the game from the dealer station by shuffling and dealing cards to players. Associated with the dealer station may be one or more dealer spots (not shown in FIG. 1) which in turn may be associated with one or more dealer detection zones. The dealer spot is a location on or in some way associated with the table 100 and/or the dealer on which tokens may be placed for detection by the detection system.

The dealer detection zone is the area in which the detection system can detect tokens placed in the dealer spot. This dealer detection zone could be used in player banked traditional table games such as those played in the State of California or other jurisdictions. The dealer detection zone may also be used to hold ante bets contributed by players in Class II gaming jurisdictions such as, but not limited to, Native American gaming establishments in the State of Florida.

A dealer interface 180 (referred to as D.I in FIGS. 1 and 2) may also be placed near the dealer position. The dealer interface 180 comprises a user interface configured to allow the dealer to provide input to the detection system and optionally receive input from the detection system. In various embodiments, the dealer interface 180 comprises one or more buttons, dials, display screens, lights or other illumination devices, speakers or other audible indicators, or analog dials, potentiometers, or keypads. Through use of the dealer interface 180, the dealer is able to provide input to the detection system or receive data from the detection system.

In one embodiment, the dealer interface 180 may be configured to provide input to the detection system regarding which player is at each player station 130 and provide confirmation, as discussed below, when a player is out of the tournament. It is also contemplated that the dealer interface 180 may also be used to over-ride automatic features of a reader system (see discussion below).

FIG. 2 illustrates a block diagram of a detection system in connection with a gaming table 200. This is but one possible example configuration and the elements of the detection system as shown are for purposes of discussion and hence are not to scale.

As part of the table 200, there is an underside 210 of the table, which is shown in FIG. 2. By way of reference, an outer surface 208 of the table and player positions or stations are labeled 1-6 and shown in FIG. 2. A player DID antenna 204 may be mounted below the table 200, and may be integral with the table, or on the top of the table. In this embodiment of the detection system, the player DID antenna 204 is below or on an underside 202 of the table 200 and provides a detection zone 206 when so instructed.

It will be apparent that any embodiments of detection systems described above may use similar detection methods. The detection zone 206 may also be understood as an area in which the energy emitted by the antenna 204 energizes a portion of a token.

The antenna 204 connects to a multiplexer, diplexer, or switch 220, which in this embodiment controls communication between a reader 226 and the antenna. It is contemplated that communication between the reader 226 and the one or more antenna 204 is bi-directional such that the reader may provide an electrical excitation signal to the antenna. The antenna 204 converts the electrical signal to an electro-magnetic field (EMF), which excites or powers the DID aspects of the token located within the detection zone. As a result and in response to the excitation EMF signal, the antenna 204 may also detect data emitted from the token. Data is sent back, via the multiplexer 220, to the reader 226.

As illustrated in FIG. 2 an electronic readable shuffler 260 may also be provided to detect when cards are dealt and optionally detect which cards are provided to each location. As described above, it is also contemplated that playing cards may be configured with DID elements. The shuffler 260 reads any playing card within the shuffler and reports outgoing playing cards. The shuffler 260 may also report discarded playing cards. This provides a monitoring system that may provide data to the detection system regarding the face value of playing cards and optionally a time and date stamp regarding when cards are dealt by the dealer in the course of play. The shuffler may also contain a inter casino linked signaling device that allows for cards to be dealt at simultaneous times in different casinos. The system may be further configured to track which players receive specific playing cards and the time at which a card is dealt or received by a particular player or presented to the table as a community card. Playing cards that are received by any player and not detected by the shuffler may be assumed to be unauthorized playing cards that have not been dealt in the course of play.

In one embodiment, the electronic readable shuffler 260 can provide playing card inventory information within any four wall casino or multi site casinos and may be managed by any software that is separate or part of a full player tracking system. A player tracking system may provide, at a moments notice, the entire token and/or playing card inventory, each shuffler inventory, floating token and/or playing card inventory (tokens and/or cards not in play and not in the shuffler), and notification when an unauthorized token and/or playing card has been played.

A wager DID antenna 224 is also provided with an associated detection zone 228 and also connects to the multiplexer/switch 220. A reader 226 may selectively read the DID information contained within the tokens placed at the player spots 206 and wager zone 224 during the course of game play. A device other than a multiplexer may be used to concurrently energize more than one antenna to speed the read process. A dealer interface 250 also connects to a monitoring system, such as to a computer 230, or via the multiplexer 220 to thereby provide input to the computer 230, such as when a shuffle occurs and new game data, place bets data, no bets accepted data or any other indication signals. The detection system on the computer 230 may also detect if bets are made or changed at times that are not allowed, or if tokens are removed from the pot (wager zone 224) at unauthorized times.

The reader 226 connects to any type processor which may be embodied in a computer 230 having memory 234. The computer is configured to execute machine readable code which may be stored on the memory 234. The machine readable code may comprise software code or code logic capable of interaction with other systems, such as the reader 226. The computer 230 may include an input interface for receiving input from a user such as tournament supervisory personnel or dealer, such as a keyboard, analog dial, potentiometer, mouse, touch screen, or any other device capable of providing information to the computer. The computer 230 may also be configured with one or more displays. The computer 230 will allow the input of information by tournament supervisory personnel and/or a dealer.

In the embodiment shown in FIG. 2, a computer 230 connects to a network interface 240 which in turn may connect to a database (not shown in FIG. 2) and/or a server 244. A database is generally understood in the art as an accessible memory for storing accessible data. The network interface may facilitate access to and communication by surveillance personnel in the casino.

Network interface 240 may comprise any device configured to communicate with one or more servers. The term network interface 240 is generally understood by a person skilled in the art. The computer 230 and/or network interfaces

240 may comprise any device configured to permit access to one or more computer programs or for user interface with the network as described above.

Furthermore, the computer 230 may comprise one or more computer programs having communication protocols configured to facilitate communication between a computer and one or more servers. It will be appreciated that communication protocols are understood by a person skilled in the art and may include internet and intranet protocols such as transmission control protocol (TCP), internet protocol (IP) and the like, and combinations thereof. As a result, the system shown in FIG. 2 may interface with similar systems located at different locations to thereby create a networked detection system capable of tracking play as described herein at a number of different tables 200. The different tables 200 may be located within the same room, in different rooms of the same property, at different properties within the same city, or at remote locations in different cites, states, or countries.

In operation, the system shown in FIG. 2 operates to monitor tokens and/or playing cards on the table. Numerous different aspects or methods of monitoring the tokens and/or playing cards on the table are possible.

When the tokens and/or playing cards are monitored or detected, in the various manners described below, the token information may be provided to the computer, processed in the manner described below, and output to a dealer, tournament supervisory personnel, surveillance, casino hosts, or other third party. In one embodiment the processing may occur at the table 200 itself, such as with a controller or control logic, and not at the computer.

The detection system may be configured in any desired manner, such as described below. In general, the detection system detects tokens and/or playing cards on the table. The detection system may be configured to detect player cheating such as when a player alters a token's denominational face value or introduces a playing card that is not part of an original card deck. In other embodiments, as discussed herein, the detection system may be utilized for other monitoring and reporting functions. In one embodiment as described below, the detection system is utilized during tournament play occurring at different tables to track and determine the order of finish or rank of players during tournament play. By monitoring the tokens, cards, or both as utilized on a table 200, the detection system may generate an accurate and consistent time and data stamp regarding when a player is out of the tournament.

2. Exemplary Embodiments of Tournament Detection Systems

Figure 3:
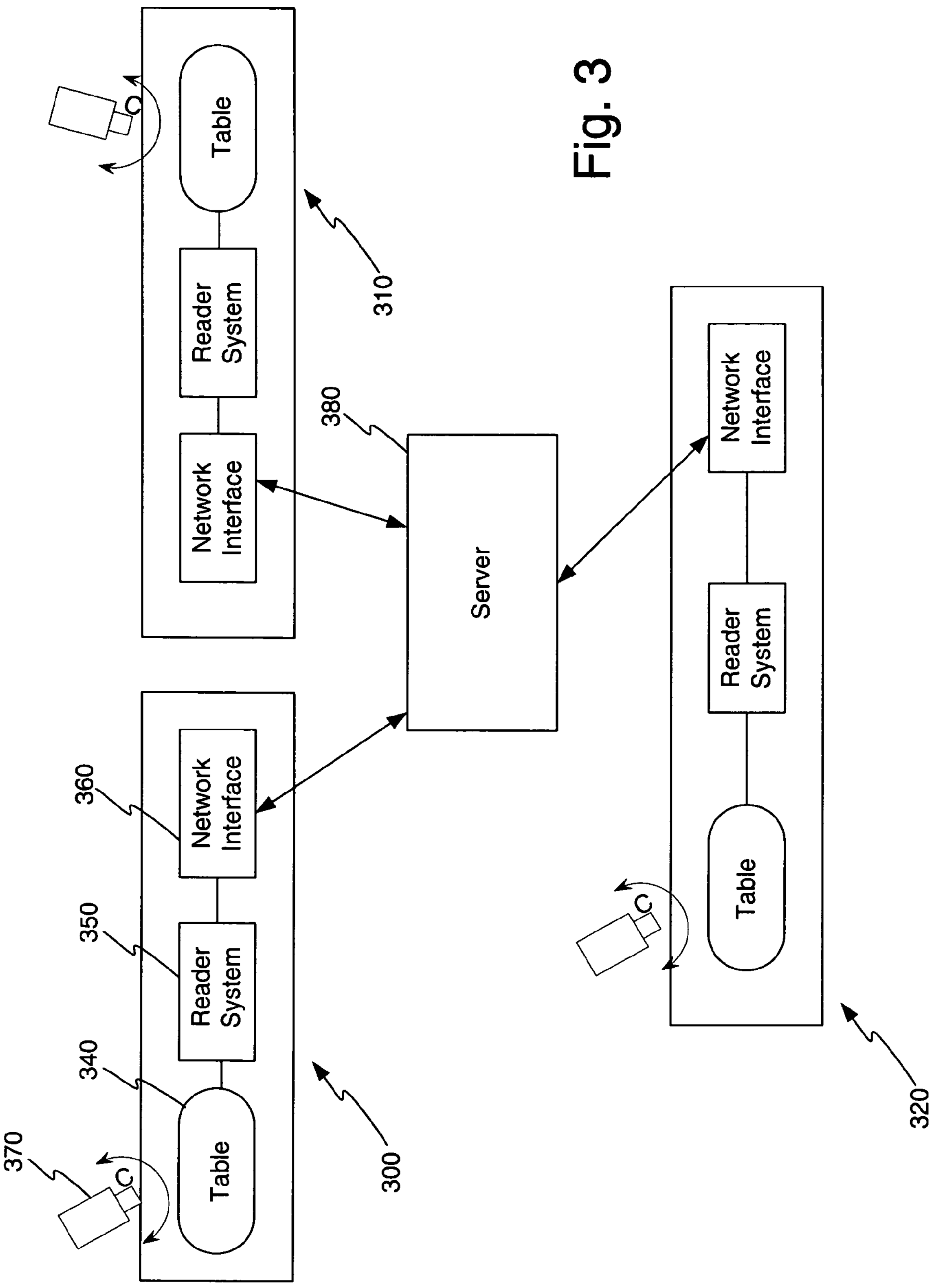
FIG. 3 illustrates a block diagram of an exemplary tournament detection system including gaming tables at different sites.

FIG. 3 illustrates a block diagram of an example embodiment of a networked detection system for use during tournament play. In this embodiment, three sites 300, 310, and 320 are provided and each is in communication with a server 380. For purposes of discussion, it is understood that this is but one possible example configuration of this embodiment and hence the block diagram is not to scale. Server 380 may comprise one or more servers and may be located anywhere including at any site such as sites 300, 310 and 320. Although this example embodiment is shown for purposes of discussion with three sites 300, 310, 320 communicating with a server 380, it is contemplated that other embodiments may utilize any number of sites. Furthermore, it will be appreciated that one or more tournaments occurring at one or more sites may be equipped with a detection system for tournament player ranking. The term site 300, 310, 320 as used herein is defined to mean one or more tables with associated detection system. The site may be configured to interface or communicate other sites.

Server 380 may comprise a computer having memory, computer software and peripherals configured to communicate with one more network interfaces 360. The computer software may include data base programs and timing programs which permit time and date stamping of data transmitted to the server (see below for further details). Alternatively, data sent to the server may be time and date stamped by each site. It will be appreciated that a server's memory may comprise any type of non-volatile memory including but not limited to peripheral devices such as flash memory, hard drives, CD's, DVD's, tapes and the like. Communication devices may comprise modems, routers and the like, and combinations thereof. As described herein, the term "servers" is understood by persons skilled in the art.

Each site 300, 310, 320 may be physically located anywhere. For example, site 300 and site 310 may be located in the same casino establishment or may be located in different casino establishments in the same city. To illustrate an advantageous aspect of a tournament detection system, site 300 may comprise a first gaming table with three players and site 310 may comprise a second gaming table with four players. Players located at the first and second table may all be playing against each other in the same tournament game. Players on both the first and second tables may be ranked as a group, even though they are not playing on a physically common gaming table.

Alternatively, site 300 may be located in an establishment in one state, while site 310 may be located in an establishment in another state. Furthermore, site 300 may be located in an establishment of one country, site 310 may be located in another establishment of the same country and site 320 may be located in yet another establishment in another country. Once again, a tournament detection system would provide for ranking of players on all tables whether players are playing on the same physical table or otherwise as described above. It is understood that the terms "casino establishment" and "establishment" denote any location where one or more tournaments having competing players may be held.

Furthermore, players may compete for one or more tournament prizes or simply compete for rank, i.e. order of finish. In an embodiment of the disclosure, one or more tournament prizes may comprise a final seat allocation in the World Series of Poker® or in the World Poker Tour™. In yet another embodiment, one or more tournament prizes may comprise currency and/or currency equivalents, vehicles, payment for rooms, food and the like, and combinations thereof. It will be appreciated that a tournament detection system may be desirable whenever player ranking leads to prize distributions. For example, the order of finish in a tournament may determine whether a player in the tournament finishes in the money, or out of the money. Stated another way, the tournament may award significant monetary award to the top 20 finishers in the tournament and as a result, the order of finish, particularly between the player who finishes 21 and the player who finishes 20 is important. When the players are located at different tables, particularly if they are in different cities or rooms, the network detection system described herein may be used to time stamp when each play is "out" of the tournament. This in turn establishes an accurate and consistent tournament ranking, even if the players are in different tables or locations.

In yet another example embodiment of the disclosure, it is contemplated that a tournament sport such as racing may equally benefit by a tournament detection system as described below. By way of example, in a racing tournament, game participants may be uniquely identified and an event timed to indicate each participant's ending event outcome in the tournament. Such an event may be the time when a participant crossed a finish line. The participant's identification coupled to the ending event outcome (crossing the finish line) provides a basis for ranking participants. Without limiting the disclosure, racing may include horseracing, dog racing, running events, swimming events and the like, and combinations thereof.

In an exemplary embodiment of a card game tournament detection system, (see FIG. 3), a site 300, 310, 320 comprises a gaming table 340, a reader system 350 (see also FIGS. 1 and 2 and description above) coupled to the gaming table and a network interface 360 coupled to the reader system. These elements are described above in detail.

Gaming table 340 may be configured in any suitable manner for playing a wagering game (see FIGS. 1 and 2 and description above). Reader systems may further comprise one or more computers (see FIG. 2 and description above). Without limiting the disclosure it will be appreciated that the network interface will couple to the detection system for a table. It will be further apparent that other sites may be configured in the same manner as site 300. It is contemplated that network interfaces 360 at each site facilitate rapid communication through server 380 between a site and any other site.

In an exemplary embodiment of the disclosure, when coupled to a reader system, a network interface may be configured to transmit data to and receive data from a server. The term "data" means any information suitable for identifying and determining any events that may occur on a gaming table. It is understood that data may also be of any kind and available from any source configured to provide data.

In addition to a reader system 350 and network interface 360, a site 300, 310, 320 may also be configured with one or more video systems 370 (see FIG. 3). Video systems may be monitoring systems providing for security of events occurring during a tournament. Optionally, video systems may comprise devices for broadcasting images of live or prerecorded events occurring during a tournament such as player appearances, a turn of cards, a wagering event, player statistics, probability of winning and the like. It will be appreciated that video systems may be configured beneficially to provide ongoing information to the viewing public regarding tournament game progress at any site. Such viewing by the public may increase viewer interest and excitement in gaming, while also entertaining and educating viewers about gaming. The video system may also be used as a supplemental system to track or confirm when a player is out of the tournament, such as in addition to the detection system described herein. The video system may have a time/data stamp. It will be appreciated that a video system and a reader system may be configured to communicate with each other. Such communication may occur using a server. A video system may be a supplementary system to track or confirm player activities such as when a player is out of the game.

Video systems 370 may comprise devices such as television, movie and still cameras, camcorders, web cameras and the like. Video monitoring systems may further comprise recording devices, such as VCR's, writeable DVD's and the like.

Furthermore, as another benefit of using RFID during tournament play, since reader systems may capture data regarding denominational values of players' tokens and the total amount held by a player, (see discussion above), reader systems may communicate this data to video systems or any other aspect of the tournament. Subsequently, viewers, such as television viewers may be provided with on-going tallies of players' tokens without having to physically count players' tokens while watching the tournament.

Referring now to FIG. 3, to illustrate an exemplary embodiment of a tournament detection system relating to a poker community card game, one or more players may be located around table 340 on site 300. Each player may initially buy a number of tokens, which are placed within each player's detection zone (see FIGS. 1 and 2 and description above) prior to playing the poker game. Similar initialization conditions may apply at other sites such as site 310 and site 320 (see FIG. 3).

The table's reader system 350 detects the player's tokens. A site's reader system communicates information about a player's status or information regarding tokens in the player's detection zone during play (or at any time) to a site's network interface 360. A site's network interface 360 communicates a reader system's token information to a server 380 which records the token information received from each network interface.

After each player receives a playing card hand, each player may make a wager by moving one or more of the player's tokens into a wager zone (see FIGS. 1 and 2 and description above). The reader system detects the remaining tokens in each player's zone and/or in each wager zone and communicates wagering information regarding tokens and tokens' entry time into the wager zone to each network interface. The transfer, and detection of such transfer by the detection system, of tokens or DID elements on the table 340 is time stamped and recorded. These time stamps, regarding any tournament event detected on the table, are communicated from each network interface to the server and recorded therein as described above. It is thus contemplated that the server receives these time stamps for tournament events from all the sites 300, 310, 320.

As described above, playing card information may also be detected by each reader system 350, time and date stamped by the reader system, and communicated via each network interface 360 to the server 380. Playing card information from each site 300, 310, 320 may be recorded in the server 380 as described above for token and/or wagering information.

In an exemplary embodiment community cards may be dealt onto a table's community cards detection zone, wherein each reader system 350 detects the community cards and transmits community cards information, such as for example a time stamp when each card was dealt, to each network interface 360. Each network interface 360 then transmits the community card information to a server 380, wherein the information is recorded. If the status of cards is used to determine or control when a player is out of the tournament, then the time stamp of the dealing or revealing of the cards may utilized by the system to establish a player's rank in the tournament.

When all rounds of wagering and community card dealing are complete, a showdown occurs, and one or more winning players are awarded a pot comprising tokens wagered by players during the game. The term "showdown" means an event where a determination is made of which player's cards combined with the community cards has a highest hand rank according to a predetermined set of rules. Player(s) with the combination of highest hand ranks are deemed the winner(s) and divide the pot. Where only one player is a winner, the entire pot is awarded to the winner.

Wagered tokens are removed from the wager zone and distributed to each winning player. When tokens are removed from each wager zone, each reader system 350 detects that there are no tokens in the wager zone, and transmits this tournament event data to each network interface 360 and then to the server 380 for recording each game's event information. Such tournament event data may comprise time stamps of when the event occurred and may also include a determination that the wager zone has no tokens, that a player zone has no tokens, or both. Similarly, each reader system 350 monitors the tokens in each player zone and transmits this token information to each network interface 360 and server 380 for recording each player's token information. As stated above, the time stamp regarding when a player is out of tokens, i.e. all in, when a particular game is over, or when a particular card is dealt, may all be relevant in determine tournament player rank.

In one embodiment, if any player's zone has no tokens and there are not any tokens in the wager zone, the server receives and records a time stamp of when the player is out of the game. The term "out of the game" refers to an event when a player may not continue playing in a current tournament game because the player has no more tokens. As discussed above, when a player is out of the tournament is important because it may determine a player's rank in the tournament.

In a game such as Texas Hold'em poker, a player out event may occur when a player wagers all their tokens in a round of play, i.e. goes all in, and does not win any of the pot. As is well understood by persons skilled in the art, a player may declare "all in" to alert other players that all of the player's tokens are being wagered.

The dealer or any other designated person may further audibly announce when a player is out of the game and record the time of this event using the dealer interface (see FIGS. 1-2 and description above).

As game play continues, the number of players at a table and in a tournament is reduced according to when each player runs out of tokens. During play, the events of the game are detected and time stamped by the detection system associated with each table, and forwarded to the server 308 where a running log may be kept of when each player is eliminated from the game. In one embodiment of ranking of players, when a predetermined number of players still remain in the game, each of the remaining players may be allocated a higher ranking compared to players that have been eliminated. When only one player still has tokens, that player may be allocated a highest ranking. Other players eliminated from the game at an earlier time may be allocated lower rankings according to the time and date stamp recorded by the server or detection system.

It will be appreciated that the time when a player is out of the game may be determined in a variety of ways depending on how time and date stamping is implemented.

In one embodiment, the time when a player is eliminated may be when a comparison of both the wager zone and the player's zone indicate no detectable tokens in both zones. That is to say, a player is out of the game only when the wager zone and a player's zone have no detectable tokens present in these zones. This would signify that the player is out of tokens and that the prior pot of tokens has been won by another player. Hence the eliminated player went all in and is now out of the tournament. The reader system would communicate this information to the server and the server would then time and date stamp that the player was out of the game, to provide a ranking.

In another embodiment, the time when a player is eliminated may be when a player out of tokens and player's zone has no playing cards and a community cards zone has playing cards. The reader system may detect that both the player's zone and the community cards zone are empty. When the player is out of tokens and the cards have been exposed to the other players, i.e. out of the player's card area, is the event that determines when the game is over. The lack of tokens by the player shows that they went all in. According to a pre-defined condition, this may be when the player is deemed out of the game. When this condition occurs, the reader system communicates this to the server, which time and date stamps that the player is out of the game.

In yet another embodiment the time when a player is eliminated may be a determination that a player's zone has no tokens and no playing cards. As stated above, the cards could be out of the card area because it is the end of a game and hence displayed to other players and the player is out of tokens. Another event that triggers when a player is out of the game may be when the reader system detects that the player has no tokens and also that no playing cards have been dealt to the player. This is an indicates that the player is out tokens and is not receiving any new cards during the next game When this condition occurs, the reader system communicates this to the server, which time and date stamps that the player is out of the game.

In a yet further embodiment the time when a player is eliminated may be when a player ID token is removed from a player's zone. A condition of being in the game may require that a player have a unique token designated the player ID token (see discussion above). If the player ID token is not detected by a reader system the player is assumed to be out of the game because they have left the table and taken their token. This information may be communicated by the reader system to the server for or with a time and date stamping to rank the player. Alternatively, if a player goes all in, then the player must also include their player ID token. This token would be detected by the detection system as an indication that the player is all in. When the player is out of the game may then be triggered on any event at the table that results in the player losing all their tokens such as the dealing of the last card or all the players revealing their cards.

In another embodiment, if a player ID token is removed from a player's zone, the time of dealing a card to the player may be designated as the time the player is eliminated by working back from earlier playing card data received and stored by the server. In this example two events provide a condition for determining when a player is out of the game. Thus, detecting that both the player ID token was removed from a detection zone and detecting the last time a card was dealt to the player prior to removal of the player ID token may be a pre-defined condition for a player being declared out of the game. If this condition is met, the reader has previously communicated both of these conditions to the server, which now may provide a time and date stamp that the player is out of the game.

Since the server 308 may receive and record all information detected by all reader systems 350, the server may be programmed to rank players based on a player's time and date stamp information during any occurrence of an "out of the game" event. It will be appreciated that these exemplary embodiments of a detection system for use in tournament ranking, i.e. to time stamp when a player is out of the game, merely illustrate but a few of many methods according to the instant disclosure.

3. Exemplary Methods for Ranking Tournament Players

Figure 4A:
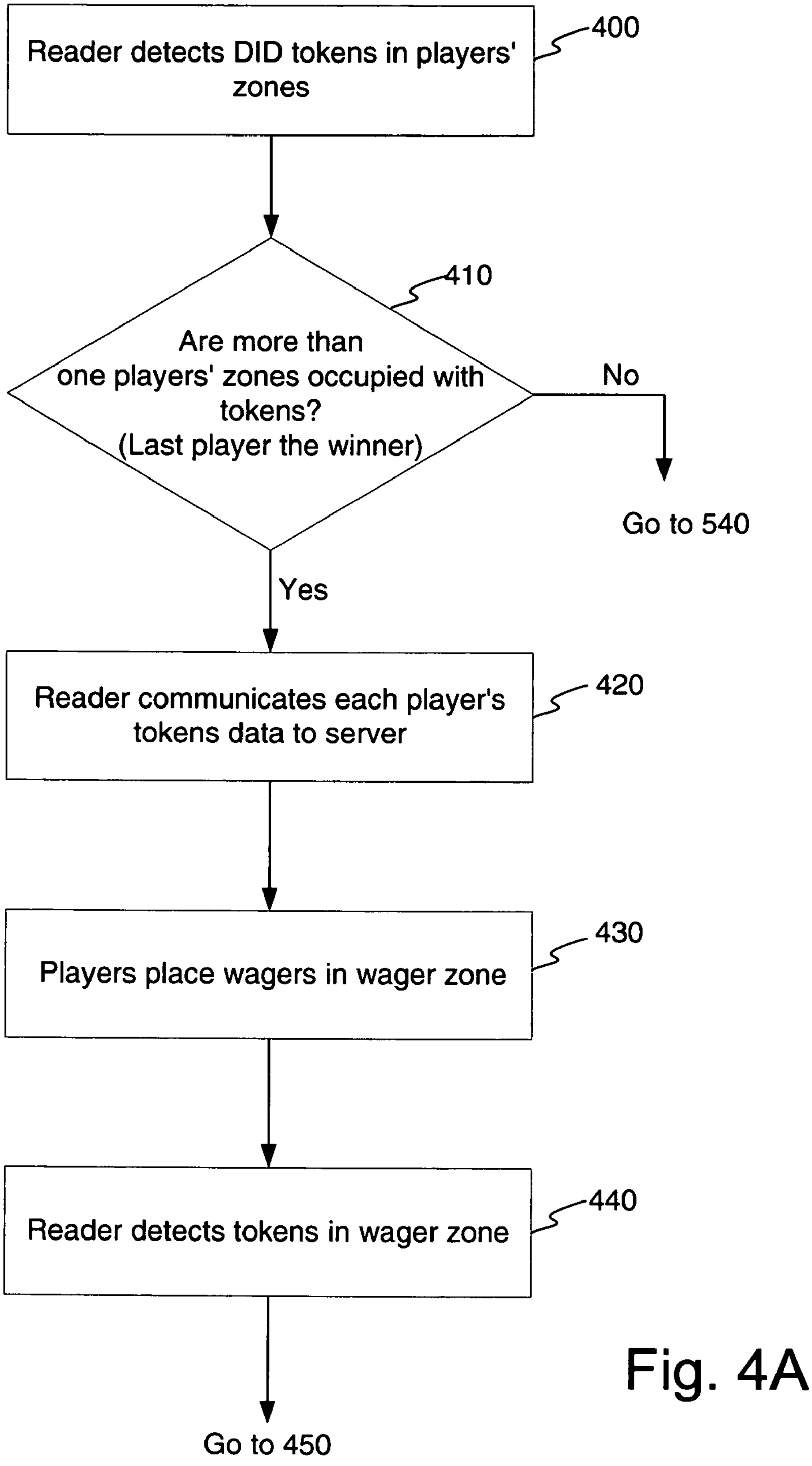
FIGS. 4A, 4B and 4C illustrate a flow diagram of an exemplary embodiment of a method for using a tournament detection system to rank tournament players.
Figure 4B:
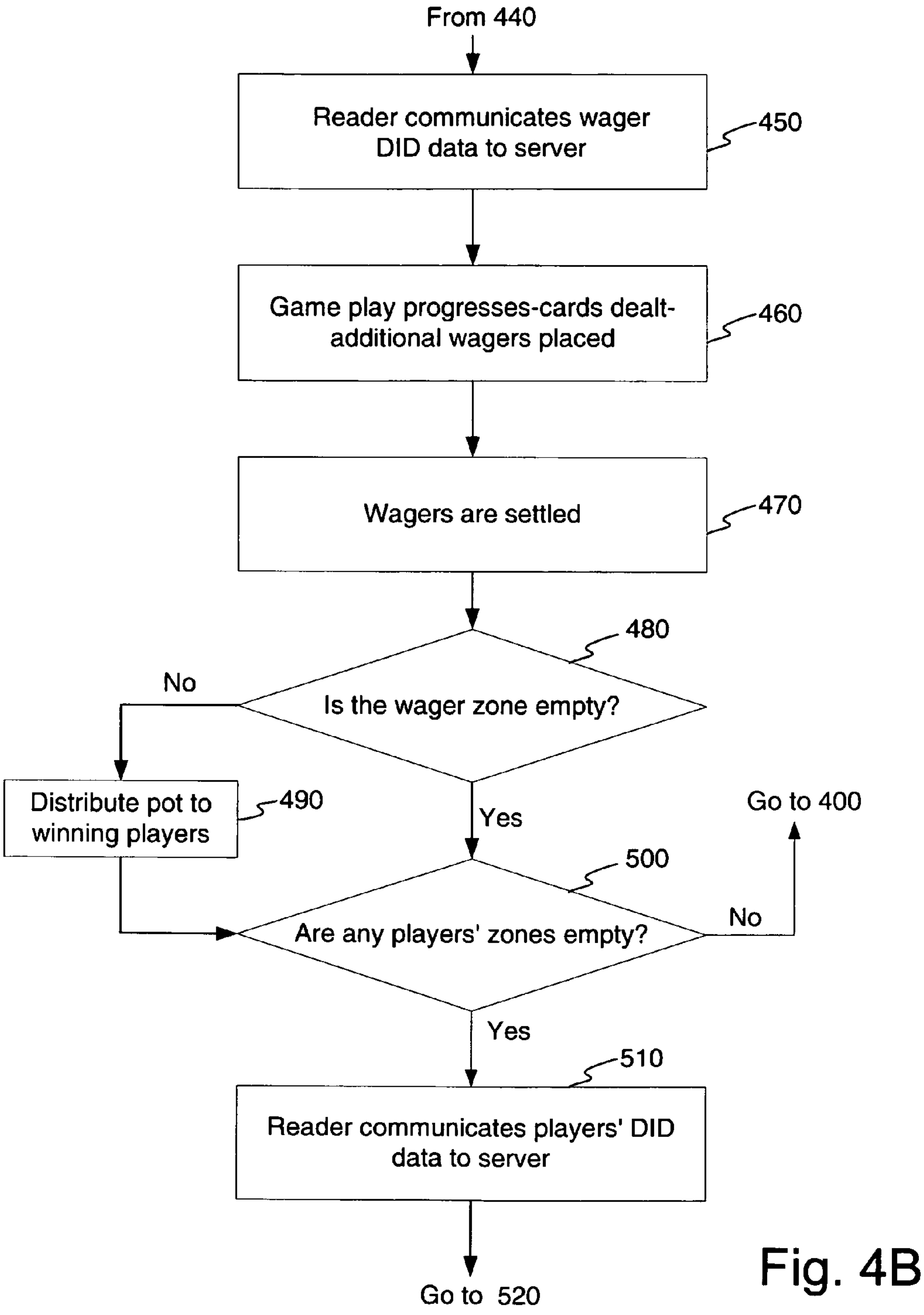
Figure 4C:
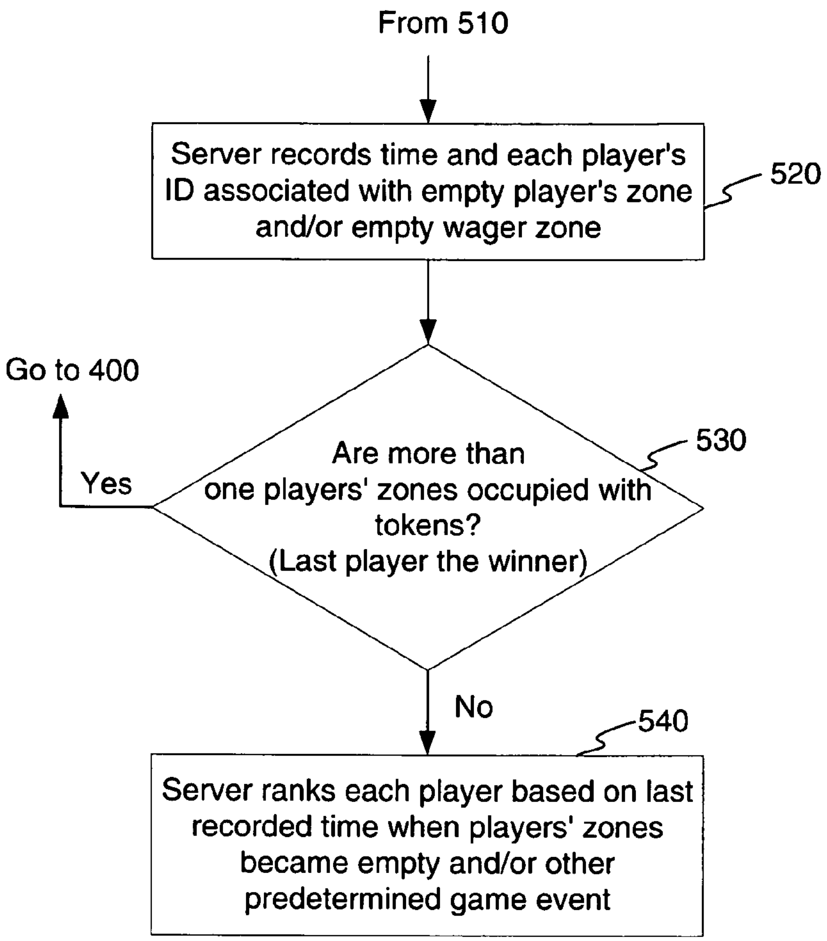

FIGS. 4A, 4B and 4C illustrate a flow diagram of an exemplary embodiment of a method for using a detection system to rank tournament players participating in wagering games at one or more sites. The flow diagram may be more easily understood in connection with a community card game such as Texas Hold'em poker or Omaha Hold'em poker. However, it will be appreciated that this is but one possible illustration of the method which may be applied to any tournament game.

Referring to FIG. 4A, initially after players receive DID tokens from an establishment and are allocated a player position at a table, they may place their tokens in their player's zone (see FIGS. 1-3 and the description above). The table may be configured with a reader system (see FIGS. 1-3 and the description above) to detect tokens on the table. In step 400 the reader system detects each player's tokens in each player's zone. Any tokens not in a player's zones are assumed to be out of play in the game or in a wager zone, where they will be detected by the detection system. A dealer, any other player or any other person designated by an establishment may alert a player when the player has tokens out of the player's zone.

At a step 410, the detection system determines whether more than one player's zone is occupied with tokens. As it is the start of the game, it is assumed that all players will have tokens and accordingly, the operation will advance to step 420.

Alternatively, after tournament play progresses, players may lose all of their tokens and as such, be out of the game. If this occurs, then from step 410 the operation advances to step 540 as shown in FIG. 4A. Step 540 is discussed below in more detail.

If more than one player zone is detected as having tokens, play continues. In step 420 a reader may communicate each player's token data to the server. As described above, such data may include denominational and any other data. Of importance to this particular example embodiment is data indicating that a player has tokens in their player zone, thereby indicating that the player is still in the tournament. When data associated with a player's zone is transmitted to the server, the server may store the data in a server's memory along with a player's unique identification and the time and date of the data.

In an embodiment of the method, the data associated with a player that is stored on the server may be rewritten each time a player's zone is updated as a result of a player's actions, such as moving tokens from the player's zone to a wager zone. In another embodiment of the method, the data stored on the server's memory may not be rewritten until player ranking has been completed for the game.

Each player may be dealt a hand of cards. In many community card games, each player is dealt two playing cards whose face values are hidden from all other players. Additionally, depending on the casino rules, one or more playing cards may be simply discarded or "burned" by the dealer to insure fairness in dealing cards. "Burned" cards may be loaded back into a discard area of a shuffling device or simply placed on a portion of a gaming table allocated for this purpose.

In step 430 one or more players may place wagers in a wager zone (see FIGS. 1-3 and the description above) if they determine that their hands are strong enough to merit a wager. Players may also fold their hands, check or re-raise other players' wagers. The terms "fold, check and re-raise" have their ordinary meaning as understood by a person skilled in the art. In many poker variants, players must place an initial wager in every round of play of the game. As a result of placing wagers in the wager zone, the reader system may detect that a player's zone has been depleted of tokens. The reader system may communicate data, with time stamps, to the server to update data referencing the player's actions, including the lack of tokens in the player zone for a particular player.

In step 440 the reader system detects tokens that have been wagered and placed in the wager zone. In particular, a time stamp may be generated regarding when the tokens entered the wager zone and which player bet the tokens. In step 450, the reader system may communicate this wager data to the server. The server may store a running denominational total of all tokens in the wager zone with time stamp data. The tokens in the wager zone comprise a pot that may be won by one or more players when a round of play of the game results in an event outcome (see discussion above in connection with FIG. 3). The server's running denominational total may be communicated to a broadcast system (such as television) wherein viewers of the game may be shown the value of the pot. Similarly, a player's chip count (tokens running value) may also be communicated to a broadcast system to be shown to viewers of the game. In this way, viewers may easily know each player's current chip count (tokens running value) without having to count a player's chips as shown by the broadcast system on the table. Use of the detection system in this manner overcomes a drawback in prior art tournaments by allowing for rapid and accurate accounting of the total wagered, the total wagered by each party, and the total amount still in the possession of each player.

In step 460, the game may progress with various events occurring. Among these events may be further card dealing and further wagering by one or more players. It is contemplated that each event on the table may be time stamped to record when each event occurred. In a community card game such as Texas Hold'em poker, the dealer may deal three cards face-up (termed the "flop") on the gaming table for viewing by all players. The face-up cards may be combined with each player's hand to form a best five card hand. Players may place further wagers by moving tokens from their player's zone to a wager zone. Optionally, players may decide on any other actions as described above. As described earlier, the reader system may detect such token data changes in each player's zone and the wager zone and report the token data changes to the server. It is contemplated that these exemplary game play steps are occurring at every site and appropriate time stamps are generated based on the actions on the table. The reader system at each site may generate the time stamp, or the server may generate the time stamp. In this example embodiment, the server stores the token data along with a time and date stamp from each site.

Community cards (such as a "turn" card and a "river" card) may be dealt by the dealer in further rounds of the game. The dealer may also "burn" cards prior to and/or after dealing any community cards. Players may decide to place further wagers by moving tokens from their player's zone to a wager zone on the table. All these actions may be detected and time stamped by the reader system. The data read from each token and/or card may be transmitted to a server where the data is recorded as described above.

In step 470, a showdown (see description above) may occur. Players who have not folded their hands compare their hands, combined with the community cards, against other player's hands combined with the community cards. One or more players may have winning hands. If a tie occurs more than one player may have a winning hand. Players having winning hands are awarded the pot, which also occurs at step 470. Tokens in the wager zone may be distributed to winning players' zones. The reader system may detect an increase of tokens in a player's zone, and transmit this data to the server with a time stamp, which may update the player's chip count (tokens running value).

In step 480, the reader system may detect if the wager zone is empty and later transmit data, with a time stamp, to the server indicating no tokens are in the wager zone. The server may time and date stamp any or all of data received from a reader system including token data, player DID token data, the player zone data, and card data or any other type of data associated with an event at the table. In step 490, if the reader system has determined the wager zone is not empty, the pot is distributed to winning players.

In step 500, the reader system may interrogate all players' zones to determine if any players' zones are empty. A condition where a player has no tokens in the player's zone may indicate the player is out of the game. If a player has no further tokens, the reader system may transmit information regarding no tokens detected in the player's zone to the server with a time stamp. The server may record the time and player's identification associated with this no tokens condition. The player is now out of the game and may no longer play in further rounds of the current tournament. The dealer may also separately record the time when a player is out of the game using a dealer interface. The dealer interface may be coupled to a local storage device or to the server. Furthermore, a video monitoring system may record that a player is out of the game according to visual and/or audio cues.

If a player has tokens which have not been placed in the player's zone, a dealer or other designated person may request that the player move the tokens into the player's zone to prevent the detection system from falsely concluding that the particular player is out of tokens and out of the tournament. When the player complies with the request, the dealer may over-ride the reader system transmission to the server indicating the player has no tokens in the player's zone and therefore prevent the player from being declared out of the game.

In step 500, if the reader system determines players' zones have tokens, a new round of play may begin (shown in FIG. 4B as a return to step 400). Alternatively in step 500, if the reader system determines any player's zone are empty, in step 510 the reader system may communicate with the server. The reader system may communicate the player's identification (ID) and date and time when the player's zone was determined to be empty (denoted the player's DID data).

In an embodiment of the method for ranking tournament players, this date and time may represent the time and date stamp showing when the player is out of the game. In addition to the time and date stamp, the player's ID associated with the empty player's zone may also be recorded to accurately track the player. It will be appreciated that each time a player is out of the game, the server may record the time and date together with the player's ID and therefore tracks when a player is out of tokens and hence out of the tournament.

In step 520, the server may record the player's DID data and/or the date and time when the wager zone last became empty. It will be appreciated that the server may record whether the wager zone is empty or contains tokens immediately after the reader system transmits token data to the server (see step 480 above).

In step 530, the reader system may determine if more than one player's zone contains tokens. Depending on the tournament rules, if only one player's zone contains tokens, that player may be declared the winner of that tournament game. If more than one player's zone contains tokens, game play may continue by the operation returning to step 400 as shown.

In step 540, when the game is finished, a computer program in the server may rank each player based on the date and time when each player's zone became empty and/or other predetermined game event according to the tournament rules. Player ranking based on the time and date when players are eliminated from the game may occur by a program sorting operation located in a server (see FIGS. 2-3 and the description above). Suitable sorting operations using appropriate software are known by persons skilled in the art. The last player having a non-empty player zone may be the winner depending upon tournament rules. It is contemplated that the server, which comprises hardware, software, or a combination or both, is continually receiving such data from the tables at a variety of sites. Upon receiving the time stamped data from the variety of site, the server may process the data and time stamp information to generate a list showing the time at which each player lost and hence left the tournament. From this, each player's tournament rank may be determined with accuracy and consistency, even though the players may be located at different locations, which would otherwise make precision ranking impossible or subjective.

As can be appreciated, this method of player ranking during tournament play has numerous advantages over the prior art. One such advantage is that even if players are located at remote locations, such as different tables or in different cities, an exact and consistent tournament rank may be maintained for each player. Precise time and/or date stamp data regarding when a player is out of the tournament is sent from each site to a shared server. The server may be configured with software to process and rank, based on time stamp data, each player. Absent such a system, it would be difficult and arbitrary to determine which of two players left the tournament first when the two players are located remote from one another and exit the tournament at approximately the same time.

Another advantage is that any one of many different 'events' may be selected to be used as the event that determines when a player is out of the tournament. For example, events that may designate when a player is out may be when they are out of tokens. However, in other embodiments, a player may be out when they are out of tokens and all the cards are displayed, or when the final community card is displayed. Alternatively, the event may be the movement of the pot to the winning player. Hence, the tournament operator may select the event determines when a player is out and such event is tracked and time stamped by the detection system.

Yet another advantage is that all aspects of tournament play may be tracked including, but not limited to, amount possessed by a player, amount bet by a player, total amount wagered, location of a player within the tournament, cards dealt, cards played by each player, and data regarding players playing of certain hands. One use of such data is an immediate and accurate count of amount bet and amount remaining with each player, which may be useful for televised play or within the tournament for use by other players. Another use of such data is to track players for assignment to new tables, such as for purposes of consolidation.

It will be appreciated that in other embodiments of a method of ranking tournament game players, any token or indicia (such as playing cards, dice, a player token and the like) may have embedded DID elements placed therein that may be interrogated by a reader during the tournament games. Hence, regardless of type of token or indicia used it may be configured to provide time and date information regarding events in the game or tournaments that is associated with a player. Such time and date information during the game coupled with the player's ID provides a basis for ranking players when they go out of the game by monitoring some aspect of the game or tournament. The particular event or indicia in use will of course depend on the type of game or tournament. Further confirmation that a player elimination event has occurred may occur when a reader determines that a wager zone, a player's playing card zone or a community card zone is empty. Hence, a single detected event may determine that a player is out of the game.

Additionally, other tournament games may be occurring at other sites (see FIG. 3 and discussion above), and the same method steps may be applied to these other tournament games. Any type of information which may better identify a player such as the player's game and/or location may also be transmitted by the reader system to the server with a time stamp.

While various embodiments of the invention have been described, it will be apparent to those of ordinary skill in the art that many more embodiments and implementations are possible that are within the scope of this invention.

The invention claimed is:

1. A method for establishing player rank in a wagering tournament, said method comprising:

(a) offering a first wagering game at a first location to a plurality of first location players, said first location including a first gaming table, a plurality of first wagering token receiving player zones on the first gaming table, and a first wager zone on the first gaming table, each of said first wagering token receiving player zones configured to receive a plurality of wagering tokens when said wagering tokens are not being wagered, said first wager zone configured to receive a plurality of the wagering tokens when said wagering tokens are being wagered, the first wagering game being part of the tournament;

(b) detecting any wagering tokens in each first wagering token receiving player zone;

(c) detecting any wagering tokens in the first wager zone;

(d) offering a second wagering game at a second location to a plurality of second location players, said second location including a second gaming table, a plurality of second wagering token receiving player zones on the second gaming table, and a second wager zone on the second gaming table, each of said second wagering token receiving player zones configured to receive a plurality of the wagering tokens when said wagering tokens are not being wagered, said second wager zone configured to receive a plurality of the wagering tokens when said wagering tokens are being wagered, the second wagering game being part of the tournament;

(e) detecting any wagering tokens in each second wagering token receiving player zone;

(f) detecting any wagering tokens in the second wager zone;

(g) during play of the tournament, for each first wagering token receiving player zone, if (i) no wagering tokens are detected in said first wagering token receiving player zone, and (ii) no wagering tokens are detected in said first wager zone, causing a deletion system processor to create a time stamped game event for said first wagering token receiving player zone;

(h) during play of the tournament, for each second wagering token receiving player zone, if (A) no wagering tokens are detected in said second wagering token receiving player zone, and (B) no wagering tokens are detected in said second wager zone, causing the deletion system processor to create a time stamped game event for said second wagering token receiving player zone; and (i) providing the time stamped game events to a processor, wherein the processor determines a player rank for said tournament based on the time stamped game events.

2. The method of claim 1, wherein detecting any wagering tokens includes using a DID element which includes a RFID tag configured to be detected by one or more antenna.

3. The method of claim 2, wherein the RFID tag is located within the wagering tokens.

4. The method of claim 1, wherein the game events are selected from the group of game events consisting of all in type wager by one of the players, a winning player receiving wagering tokens from a pot, cards being revealed, and a player ID being placed in one of the wagering token receiving player zones.

5. The method of claim 1, wherein the first location comprises a different gaming table than the second location and the wagering game comprises a card game and player rank determines which players finish higher in the tournament than the other players.

6. A system for ranking players in a tournament, said system comprising:

a first and second game table, wherein each of the first and second game table includes:

(a) a wagering zone on said table and configured to accept wagers of wagering tokens from a plurality of players;

(b) a plurality of wagering token receiving player zones on said table, each of said wagering token receiving player zones configured to receive a plurality of the wagering tokens when said wagering tokens are not being wagered; and (c) a detection system proximate to the wagering zone and the wagering token receiving player zones and configured to detect the wagering tokens during tournament game play;

a detection system processor in communication with the detection system configured to receive the data from said detection system, and create a time stamped game event during play of the tournament, when:

(i) no wagering tokens are detected in one of the wagering token receiving player zones at one of the gaming tables, and (ii) no wagering tokens are detected in the wagering zone at said gaming table;

and a server configured to receive said time stamped game events from the detection system processor and determine player ranking for the tournament based on the time stamped game events.

7. The system of claim 6, wherein the detection system comprises one or more antenna and one or more readers.

8. The system of claim 6, wherein the detection system processor comprises a computer configured with machine readable code.

9. The system of claim 6, wherein the first game table and the second game table are located in different casinos.

10. The system of claim 6, wherein the game events include data regarding one of the players going all in, one of the players exposing their cards, a final community card being exposed, a pot being collected or provided to a winning player, or one of the players providing a player ID token to one of the wagering token receiving player zones.

11. The system of claim 6, wherein the detection system processor is configured to utilized the Internet to transmit game data to the server.

12. A method of offering a wagering tournament wherein players are located at different locations, said method comprising:

(a) providing a first game table at a first location to a first group of players, wherein the first game table is configured with a first table monitoring system to monitor game events, wherein said first monitoring system detects any wagering tokens in a first wager zone on the first game table and in a plurality of first wagering token receiving player zones on the first game table, each of said first wagering token receiving player zones configured to receive a plurality of the wagering tokens when said wagering tokens are not being wagered, said first wager zone configured to receive a plurality of the wagering tokens when said wagering tokens are being wagered;

(b) causing the first table monitoring system to create first location game event data when no wagering tokens are detected in one of said first wagering token receiving player zones and no wagering tokens are detected in said first wager zone, wherein the first location game event data is time stamped;

(c) providing a second game table at a second location to a second group of players, wherein the second game table is configured with a second table monitoring system to monitor game events, wherein said second table monitoring system detects any wagering tokens in a second wager zone on the second game table and in a plurality of second wagering token receiving player zones on the second game table, each of said second wagering token receiving player zones configured to receive a plurality of the wagering tokens when said wagering tokens are not being wagered, said second wager zone configured to receive a plurality of the wagering tokens when said wagering tokens are being wagered;

(d) causing the second table monitoring system to create second location game event data when no wagering tokens are detected in one of said second wagering token receiving player zones and no wagering tokens are detected in said second wager zone, wherein the second location game event data is time stamped;

(e) transmitting the first location game event data and second location game event data to a processor at a central processing site;

(f) processing the time stamps of the first location game event data and the second location game event data to determine a chronological order of the game events at the first location and second location;

(g) determining player ranking of the players in the first group or the second group based on said processed data.

13. The method of claim 12, wherein the central processing site is located at the first location or the second location.

14. The method of claim 12, wherein the player ranking determines order of exit from the tournament and the player ranking accurately determines order of finish between one of the players of the first group players and one of the players of the second group players when said first group player and said second group player exit the tournament at similar times.

15. The method of claim 1, which includes detecting each player's tokens that include that player's information and creating the time stamped game events for said first and second wagering token receiving player zones includes associating the time stamped game events with each of the player's information.

16. The system of claim 6, wherein the detection system is configured to detect player tokens that include each player's information.

17. The method of claim 12, which includes detecting each player's tokens that include that player's information and creating first location game event data and second location game event data based, at least in part, on the information on each player's token.

18. A method for operating a tournament, said method comprising:

(a) offering a play of a first tournament game to a plurality of first players at a first table, said first table including a plurality of first wagering token receiving player zones and a first wager zone, each of said first wagering token receiving player zones configured to receive a plurality of wagering tokens when said wagering tokens are not being wagered, said first wager zone configured to receive a plurality of the wagering tokens when said wagering tokens are being wagered;

(b) offering a play of a second tournament game to a plurality of second players at a second table, said second table including a plurality of second wagering token receiving player zones and a second wager zone, each of said second wagering token receiving player zones configured to receive a plurality of the wagering tokens when said wagering tokens are not being wagered, said second wager zone configured to receive a plurality of the wagering tokens when said wagering tokens are being wagered;

(c) after a winner is determined for said play of said first tournament game:

(i) for each first wagering token receiving player zone, detecting any wagering tokens in said first wagering token receiving player zone, (ii) detecting any wagering tokens in the first wager zone, and (iii) if the first wager zone does not include any detected wagering tokens and any of the first wagering token receiving player zones do not include any detected wagering tokens, causing a detection system processor to create time stamped data regarding which of the first wagering token receiving player zones do not include any wagering tokens;

(d) after a winner is determined for said play of said second tournament game:

(i) for each second wagering token receiving player zone, detecting any wagering tokens in said second wagering token receiving player zone, (ii) detecting any wagering tokens in the second wager zone, and (iii) if the second wager zone does not include any detected wagering tokens, and any of the second wagering token receiving player zones do not include any detected wagering tokens, causing a detection system processor to create time stamped data regarding which of the second wagering token receiving player zones do not include any wagering tokens; and (e) providing the created time stamped data to a processor, wherein the processor is programmed to determine a player ranking for the tournament based on the time stamped data.

19. The method of claim 18, which includes repeating (a) and (c) for each of a plurality of plays of said first tournament game.

20. The method of claim 18, which includes repeating (b) and (d) for each of a plurality of plays of said second tournament game.

21. The method of claim 18, wherein the first tournament game and the second tournament game are a same type of game.

22. The method of claim 18, wherein said first wager zones and said first wagering token receiving player zones are located on a top surface of said first game table and said second wager zones and said second wagering token receiving player zones are located on a top surface of said second game table.

23. The system of claim 6, wherein each of the first and second game table includes: the wagering zone and the plurality of wagering token receiving player zones being located on a top surface of said game table.

24. The method of claim 12, wherein said first wager zones and said first wagering token receiving player zones are located on a top surface of said first game table and said second wager zones and said second wagering token receiving player zones are located on a top surface of said second game table.

* * * * *

UNITED STATES PATENT AND TRADEMARK OFFICE

CERTIFICATE OF CORRECTION

PATENT NO. : 7,704,144 B2
APPLICATION NO. : 11/337176
DATED : April 27, 2010
INVENTOR(S) : Eric L. Abbott It is certified that error appears in the above-identified patent and that said Letters Patent is hereby corrected as shown below:

IN THE CLAIMS:

In Claim 4, Column 20, Line 7, insert --an-- between the terms "of" and "all".

In Claim 12, Column 21, Line 43, insert --and-- after ";".

Signed and Sealed this

Sixth Day of July, 2010

David J. Kappos

David J. Kappos
*Director of the United States Patent and Trademark Office*